(12) United States Patent
Tsukagoshi

(10) Patent No.: US 6,223,483 B1
(45) Date of Patent: May 1, 2001

(54) VIBRATION DAMPING MECHANISM AND ANTI-EARTHQUAKE WALL MATERIAL

(76) Inventor: Isamu Tsukagoshi, C-1509, 2-1, Sunadabashi, Higashi-ku, Nagoya-shi, Aichi-ken (JP)

( * ) Notice: Subject to any disclaimer, the term of this patent is extended or adjusted under 35 U.S.C. 154(b) by 0 days.

(21) Appl. No.: 09/395,943

(22) Filed: Sep. 14, 1999

(51) Int. Cl.[7] .................................................. E02B 1/98
(52) U.S. Cl. ........................................ 52/167.1; 52/167.7
(58) Field of Search .......................... 52/167.1, 167.2, 52/167.3, 167.4, 167.5, 167.6, 167.7; 188/378; 267/136; 248/559, 562, 564, 566, 570

(56) References Cited

U.S. PATENT DOCUMENTS

| | | | |
|---|---|---|---|
| 4,533,109 | * 8/1985 | Delam | 248/542 |
| 5,083,404 | * 1/1992 | Schulte | 52/167 R |
| 5,271,197 | * 12/1993 | Uno et al. | 52/167 R |
| 5,682,712 | * 11/1997 | Kemeny | 52/167.7 |
| 5,732,802 | 3/1998 | Tsukagoshi | 188/378 |
| 5,875,589 | * 3/1999 | Lai et al. | 52/1 |
| 5,915,676 | * 6/1999 | Abiru et al. | 267/136 |
| 5,946,866 | * 9/1999 | Weglewski et al. | 52/167.1 |

* cited by examiner

Primary Examiner—Daniel P. Stodola
Assistant Examiner—Curtis A. Cohen
(74) Attorney, Agent, or Firm—Nixon Peabody LLP; Donald R. Studebaker

(57) ABSTRACT

A vibration damping mechanism and an anti-earthquake wall material for providing a building or other structure with strength and rigidity, and a capability of damping the vibrations. On one or both sides of a base plate material (43) to be connected to a framework (50), an auxiliary plate material (44) is jointed with a space being formed. A viscoelastic body (M) is filled into the space, the base plate material (43) is selected so that it can cause elastic buckling, and by deformation and movement of the viscoelastic body (M), the vibration energy is absorbed.

1 Claim, 12 Drawing Sheets

F I G. 1A
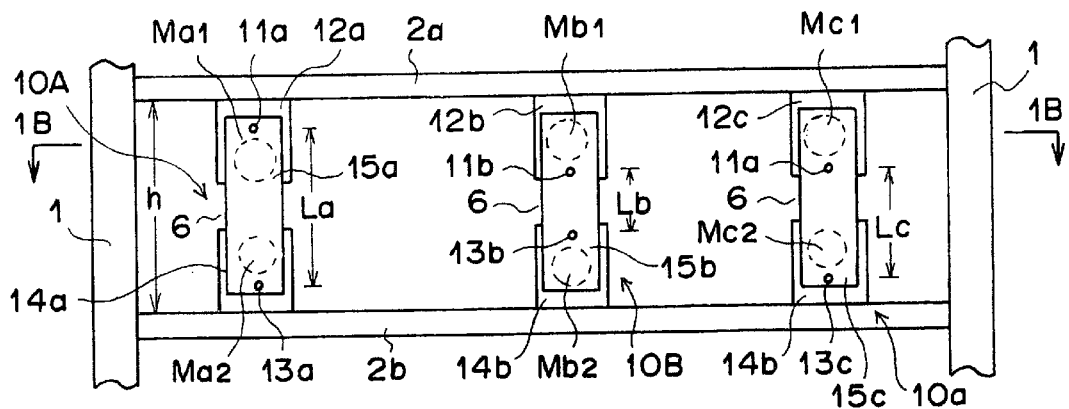
F I G. 1B
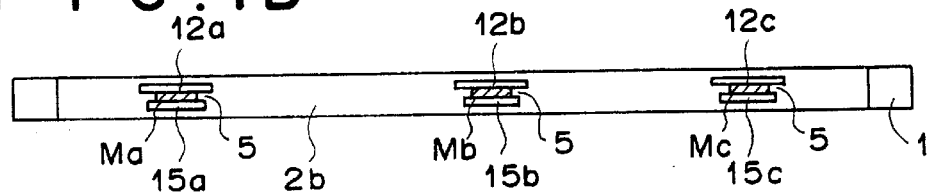
F I G. 2
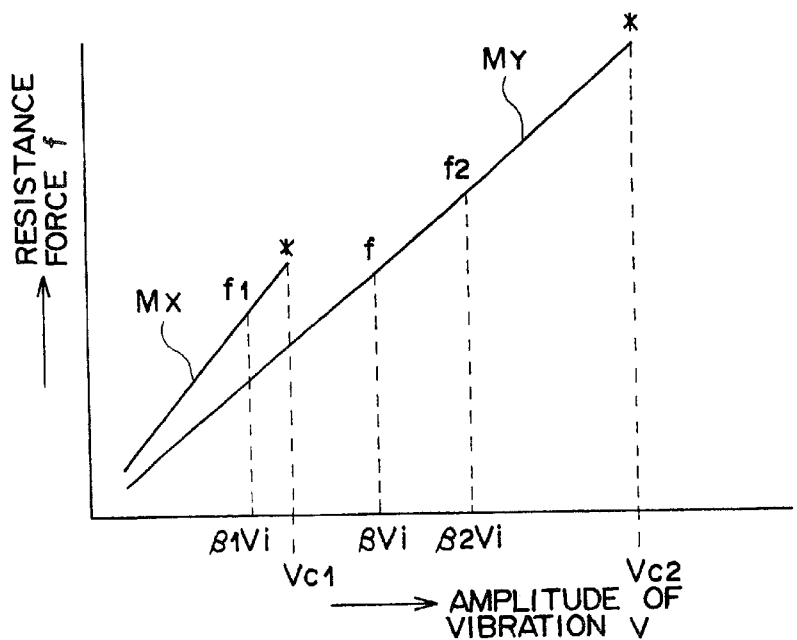

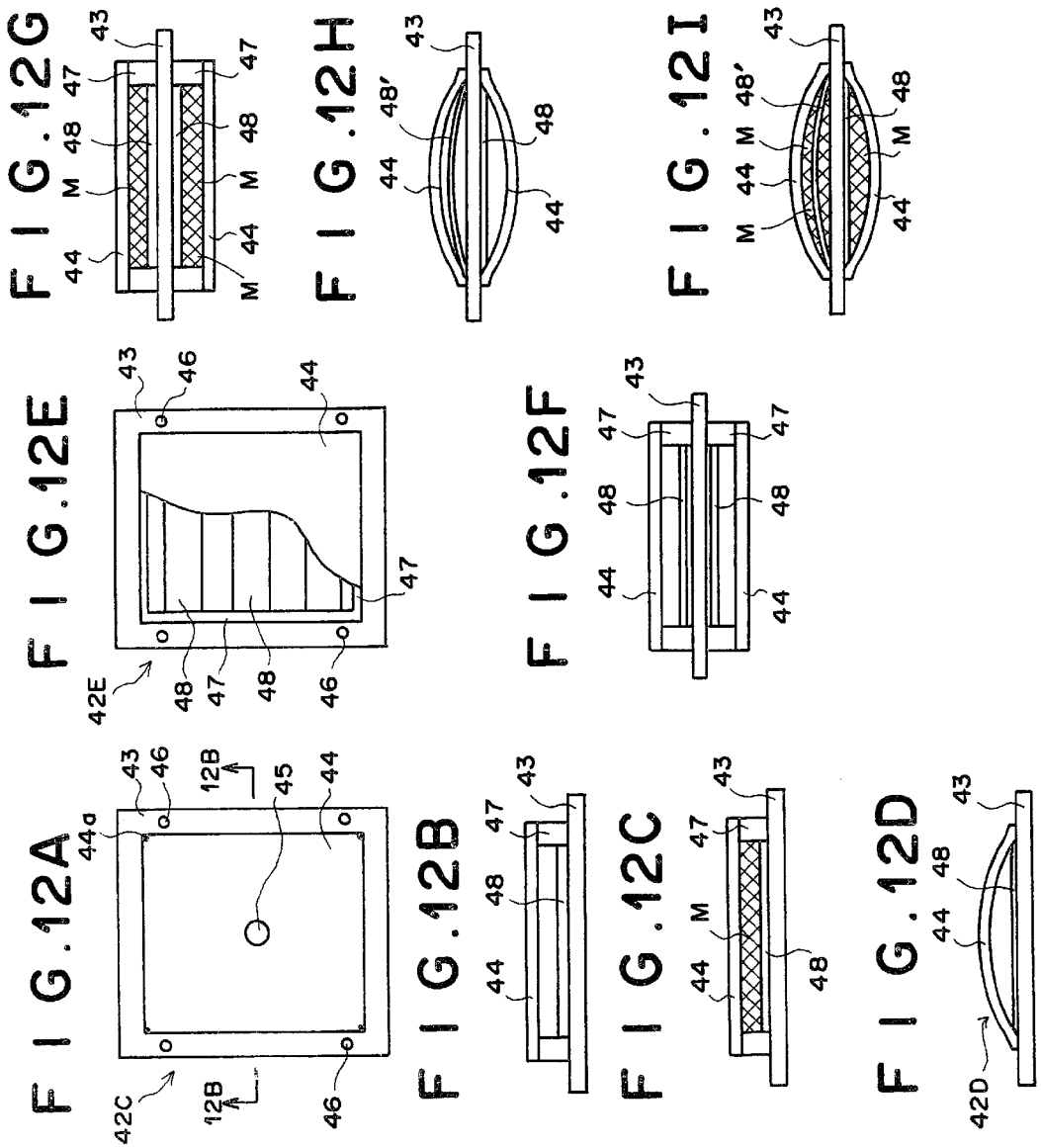

VIBRATION DAMPING MECHANISM AND ANTI-EARTHQUAKE WALL MATERIAL

BACKGROUND OF THE INVENTION

1. Field of the Invention

The present invention relates to a vibration damping mechanism and an anti-earthquake wall material for reducing the vibration of a structure such as a building.

2. Description of the Prior Art

A vibration damping mechanism which uses a viscoelastic body to efficiently reduce the vibration of a structure has been given in Japanese Unexamined Patent Publication No. 7 (1995)-247727. According to this patent publication, there is disclosed a vibration damping mechanism in which a first pivot and a second pivot are mounted to opposed frame members of a structure, respectively, with an appropriate spacing, a first fixed plate which is rotatable with respect to the first pivot, and a second fixed plate which is rotatable with respect to the second pivot are opposed with a gap between them, and a viscoelastic body is filled into this gap, and with this vibration damping mechanism, the viscoelastic body is selected according to the conversion factor $\beta=L/h$.

With the conventional vibration damping mechanism, the viscoelastic body is selected according to the conversion factor $\beta=L/h$, which makes it difficult to manufacture the vibration damping mechanism. In addition, the vibration damping mechanism using a viscoelastic body is for large-scale buildings, and to apply it for small-scale buildings, such as a wooden house or a light-weight steel-frame house, a convenient mechanism is demanded in consideration of the cost. The present invention offers a vibration damping mechanism which is still more convenient in configuration, and can efficiently reduce the vibration of a structure.

Thin-plate anti-earthquake wall materials are connected to a framework (beam or column) for a building or the like, and when the deformation of the framework is small, the thin plate provides a high rigidity in conjunction with the frame work. However, when the deformation of the framework is great, the thin plate buckles (so-called wrinkles are produced), resulting in the rigidity being reduced. For this reason, such buckling has been considered to be harmful, and for thin-plate buckling phenomena, the buckling deformation and load have been determined with high accuracy, and reasonable reinforcing methods for preventing the buckling have been devised. For example, the shear load bearing material used in an airplane, a vehicle, a ship, a bridge, a building or the like is an aggregate of a thin plate and a number of reinforcing materials, being free from elastic buckling, in other words, being configured so that plastic buckling can be caused, and with the plastic buckling, the distortion energy is absorbed and the vibration is reduced. Consequently, because the buckling load for a shear load bearing material (having a length of the shorter side of "a" and a thickness of "t") is in proportion to $(t/a)^2$, the value of (t/a) is made sufficiently large to prevent buckling from being caused within the limit of elastic deformation.

Therefore, a framework to which an anti-earthquake wall material free from elastic buckling is connected has practically no capacity to absorb the vibration energy, providing a construction which has strength, but rocks significantly in an earthquake or a typhoon. On the other hand, a framework to which an anti-earthquake wall material causing plastic buckling is connected provides an effect of preventing rocking of a building by absorbing the plastic distortion, but brings about a substantial reduction in rigidity, the external force to be born by the anti-earthquake wall material being transferred to the framework connected to the anti-earthquake wall material, which results in an increase in deformation of the framework, leading to plasticization of the framework, and at the subsequent stage, a collapse of the structure. In other words, if an anti-earthquake wall material free from elastic buckling is used, a structure which significantly rocks in an earthquake or a typhoon is provided, and only if the anti-earthquake wall material has been plasticized through a great deformation in an earthquake, is the degree of rocking of with the structure decreased. However, if an anti-earthquake wall material is an elastic body, and yet is provided with an energy absorbing capability, a structure with which the degree of rocking is low, and which will not collapse can be produced. As the energy absorption mechanism, a damper is available, but the damper will not contribute any increase in strength and rigidity. The present invention offers an anti-earthquake wall material which is provided with features of strength, rigidity, and energy absorbing capability.

SUMMARY OF THE INVENTION

The present invention offers a vibration damping mechanism for a structure which comprises a first fixed plate which is fixed to an upper frame member of a structure and is provided with a first pivot, and a second fixed plate which is fixed to a lower frame member opposed to the upper frame member with an appropriate spacing and is provided with a second pivot. A connecting plate which is rotatably mounted with the first pivot and the second pivot is opposed to the first fixed plate and the second fixed plate with a gap being provided, and a viscoelastic body is filled into the gap between the connecting plate and the first fixed plate, and the gap between the connecting plate and the second fixed plate. Thus, the connecting plate is configured so that it can be turned with the first pivot and the second pivot, which means that the viscoelastic body can be selected according to the position of the first pivot and the second pivot, which allows a vibration damping mechanism can be manufactured conveniently.

Further, the present invention offers an anti-earthquake wall material which is connected to a framework for a building, etc., in which, on one side or both sides of a base plate material to be connected to the framework, a space is formed with an auxiliary plate material smaller than the base plate material. A viscoelastic body is filled into the space, and the base plate material is selected so that it can cause elastic buckling.

Further, the present invention offers an anti-earthquake wall material in which the auxiliary plate material is an auxiliary plate material which can deform with no resistance.

Further, the present invention offers an anti-earthquake wall material which is connected to a framework for a building, etc., in which, on one side or both sides of a base plate material to be connected to the framework, a space is formed with an auxiliary plate material smaller than the base plate material; a lead plate material is loaded in the space along the auxiliary plate material and a viscoelastic body is filled into the space. The base plate material is selected so that it can cause elastic buckling.

Further the present invention offers an anti-earthquake wall material which is connected to a framework for a building, etc., in which the anti-earthquake wall material is rotatably mounted to the framework, a fitting groove and a projection are formed in the joint between adjacent anti-earthquake wall materials or to a column, and in that place, a viscoelastic body is sandwiched for jointing.

Thus, by filling a viscoelastic body into a space formed with the use of an auxiliary plate material on one side or both sides of a base plate material, and configuring so that the auxiliary plate material smaller than the base plate material can cause elastic buckling, rigidity can be provided and the vibration energy can be absorbed. Adjacent anti-earthquake wall materials are jointed with a viscoelastic body being provided in the joint, thus providing a waterproof effect, and the degree of rocking of a framework can be reduced by the vibration energy absorption function of the viscoelastic body.

BRIEF DESCRIPTION OF THE DRAWINGS

FIG. 1A shows a front view of a vibration damping mechanism in a first embodiment;

FIG. 1B shows a sectional view taken along the line 1B—1B in FIG. 1A;

FIG. 2 shows a characteristic curve diagram for a viscoelastic body;

FIG. 12A to FIG. 12I are conceptual plan and sectional views of various anti-earthquake wall materials in a sixth embodiment;

DESCRIPTION OF THE PREFERRED EMBODIMENTS

Figure 3:
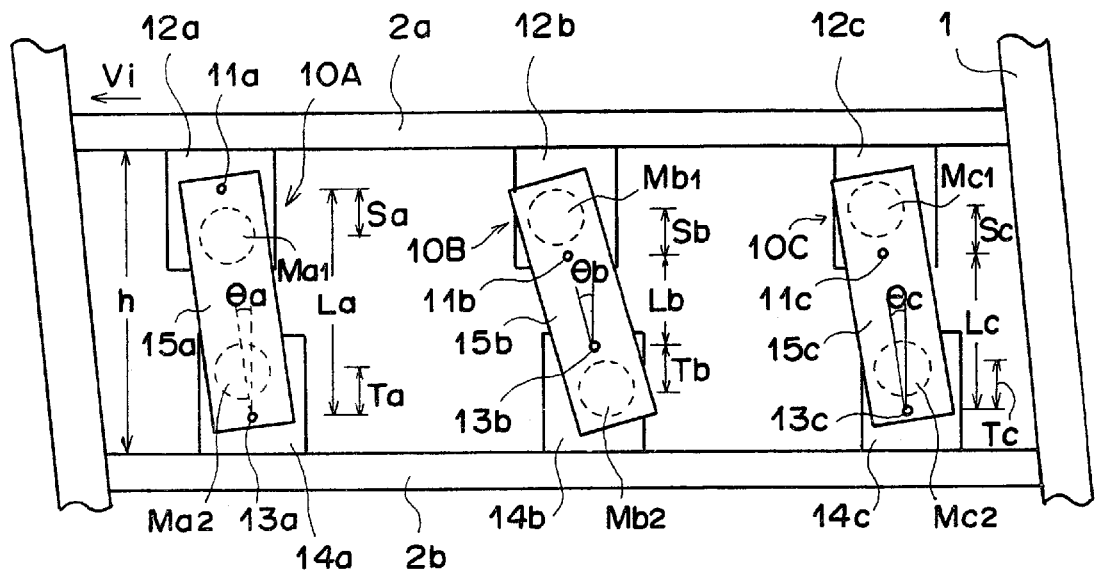
FIG. 3 is a drawing for explaining the function of the vibration damping mechanism.

The preferred embodiments of the present invention will be explained with reference to the attached drawings.

1st Embodiment

The embodiment of the present invention will be explained with reference to the drawings. FIG. 1A shows a front view of a vibration damping mechanism 10A, 10B, 10C which is mounted to a frame structure, and FIG. 1B shows a sectional view taken along the line 1B—1B. In FIG. 1A and FIG. 1B, a horizontal member (frame member) 2 is horizontally disposed between columns (frame members) 1, 1 as vertical members which are vertically disposed with a specified spacing. 10A is a vibration damping mechanism disposed between these opposed horizontal members 2, and the vibration damping mechanism 10A comprises a pivot 11a, 13a, a first fixed plate 12a, a second fixed plate 14a, a connecting plate 15a, and a viscoelastic body Ma (Ma1, Ma2).

The first fixed plate 12a, which is a flat plate, is fixed to an upper frame member 2a of the structure, and the first fixed plate 12a is provided with the first pivot 11a on the upper frame member 2a side. The second fixed plate 14a, which is a flat plate, is fixed to a lower frame member 2b which is opposed to the upper frame member 2a with an appropriate spacing, being provided with a gap 6 to the first fixed plate 12a (a distance which prevents the first fixed plate 12a, which can be inclined, and the second fixed plate 14a, which can be inclined, from being contacted with each other), and the second fixed plate 14a is provided with the second pivot 13a on the lower frame member 2b side. The distance between the upper frame member 2a and the lower frame member 2b is h, and the distance between the first pivot 11a and the second pivot 13a is La.

The connecting plate 15a, which is a flat plate, is mounted so that it can be turned with the first pivot 11a and the second pivot 13a. The first fixed plate 12a is opposed to the connecting plate 15a, being provided with a gap 5, and these gaps 5 are filled with the viscoelastic body Ma1, Ma2. According to the positions of the first pivot 11a and the second pivot 13a, the viscoelastic body Ma1, Ma2 is filled on the lower side of the first pivot 11a and the upper side of the second pivot 13a, respectively.

The vibration damping mechanism 10B has basically the same configuration as that of the vibration damping mechanism 10A, comprising a pivot 11b, 13b, a first fixed plate 12b, a second fixed plate 14b, a connecting plate 15b, and a viscoelastic body Mb (Mb1, Mb2). With the vibration damping mechanism 10B, the first pivot 11b and the second pivot 13b are located on the free end side of the first fixed plate 12b and that of the second fixed plate 14b, respectively, the distance being Lb. The viscoelastic body Mb1, Mb2 is then filled on the upper side of the first pivot 11b and the lower side of the second pivot 13b. The vibration damping mechanism 10C also has almost the same configuration as that of the vibration damping mechanism 10A, comprising a pivot 11c, 13c, a first fixed plate 12c, a second fixed plate 14c, a connecting plate 15c, and a viscoelastic body Mc (Mc1, Mc2). With the vibration damping mechanism 10C, the first pivot 11c is located on the free end side of the first fixed plate 12c, and the second pivot 13c is located on the lower frame member 2b side, the distance being Lc. The viscoelastic body Mc1, Mc2 is then filled on the upper side of the first pivot 11c and the upper side of the second pivot 13c.

As the viscoelastic body M (Ma, Mb, Mc), such a substance as asphalt containing organic polymer is used. FIG. 2 shows the dynamic characteristic curve for the viscoelastic body M, the abscissa representing the amplitude of vibration V applied to the viscoelastic body M (or the deformation rate S, or the amount of shear deformation). With a given structure, the amplitude of vibration V is proportional to the deformation rate S, and thus both refer to the same thing. Therefore, they are represented by the amplitude of vibration V hereafter. The ordinate represents the resistance force per unit area f. As can been seen from FIG. 2, the dynamic characteristic curve for the viscoelastic body M varies depending upon the type thereof, and generally, with a hard material MX, the resistance gradient is large, and thus a high resistance force f can be obtained even for a small amplitude of vibration (amount of deformation) V. However, with a large amplitude of vibration V, the resistance force f is abruptly lowered, resulting in the function being lost, and thus the limit amplitude of vibration Vc1 is small. On the other hand, with a soft material MY, the resistance gradient is small, and thus for a given amplitude of vibration, only a low resistance force f can be obtained compared to the hard material MX. However, the soft material MY can withstand a large amplitude of vibration V, having a property of the limit amplitude of vibration Vc2 being large.

Next, the vibration damping action when a vibration having an amplitude of vibration Vi (the amount of displacement of the upper frame member 2a relative to the lower frame member 2b) is horizontally applied to the vibration damping mechanism 10A will be described with reference to FIG. 3. As shown in FIG. 3, it is assumed that the distance between the first pivot 11a and the second pivot 13a is La, the center distance between the first pivot 11a and the viscoelastic body Ma1 is Sa, and the distance between the second pivot 13a and the viscoelastic body Ma2 is Ta. The deformation of the first fixed plate 12a and the second fixed plate 14a which are fixed to the upper frame member 2a and the lower frame member 2b, respectively, is so small that it is negligible.

The amplitude of vibration Vi in the horizontal direction provides an amount of displacement of Vi for the first pivot 11a, and the connecting plate 15a is turned through a minute angle of $\theta a$ around the first pivot 11a, the second pivot 13a with the position of the first fixed plate 12a relative to the second fixed plate 14a being changed by the same amount. Therefore, the amount of deformation Vi of the viscoelastic body Ma1 is equal to Sa×tan ($\theta a$), and the amount of deformation V2 of the viscoelastic body Ma2 is equal to Ta×tan ($\theta a$)=Vi/La. Therefore, the amount of deformation V1 of the viscoelastic body Ma1 is equal to Sa·Vi/La, and the amount of deformation V2 of the viscoelastic body Ma2 is equal to Ta·Vi/La, and by selecting the appropriate values of La, Sa, and Ta, the viscoelastic body Ma1, Ma2 (Ma1 may be identical to Ma2) which can provide the most effective absorption of energy can be selected.

In the above relationship, if the conversion factor $\beta 1$ is equal to Sa/La, the conversion factor $\beta 2$ is equal to Ta/La, the amplitude of vibration V of the viscoelatic body is related to the distance between the first pivot 11a and the second pivot 13a, and can also be expressed by V=$\beta$·Vi. Also for the vibration damping mechanism 10B, 10C, by selecting the distances Lb, Sb, and Tb, Lc, Sc, and Tc as shown in FIG. 3, which correspond to the distances La, Sa, and Ta for the vibration damping mechanism 10A, the viscoelastic body Mb, Mc which can provide the greatest effect can be selected.

Selection of the viscoelastic body Ma (Ma1, Ma2) in the vibration damping mechanism 10A will be specifically explained with reference to FIG. 2.

(1) If the distances Sa and Ta are selected so that Sa >Ta, La>Sa>Ta, and $\beta 2 < \beta 1 < 1$. Assuming that the amplitude of vibration Vi is caused in the vibration damping mechanism 10A, the amount of deformation V1 of the viscoelastic body Ma1 is equal to $\beta 1$·Vi, and the amount of deformation V2 of the viscoelastic body Ma2 is equal to $\beta 2$·Vi. Therefore, the amount of deformation Vi is larger than the amount of deformation V2, thus, by selecting the viscoelastic body MX for the viscoelastic body Ma1, and selecting the viscoelastic body MY for the viscoelastic body Ma2, a resistance force f1 (f1<f2) is obtained. Thus, for the viscoelastic body Ma1, Ma2 in the vibration damping mechanism 10A, an appropriate viscoelastic body MX, My can be selected to provide effective energy absorption.

(2) If the distances Sa and Ta are selected so that Sa=Ta, La>Sa=Ta, and $\beta 2 = \beta 1 < 1$, the amount of deformation V1 of the viscoelastic body Ma1 is equal to the amount of deformation V2 of the viscoelastic body Ma2. Then, the distance Sa (=Ta) and the viscoelastic body can be selected so that the limit amplitude of vibration Vc1 (or Vc2) of the viscoelastic body is not reached.

In the vibration damping mechanism 10B, (1) selection is made so that Sb>Tb>Lb, $1 < \beta 2 < \beta 1$.

(2) selection is made so that Sb>Lb>Tb, $1 < \beta 1$, and $\beta 2 < 1$.

(3) selection is made so that Lb>Sb>Tb, $\beta 2 << \beta 1 < 1$.

Thus, by appropriately selecting the distance Lb between the first pivot 11b and the second pivot 13b, the center distance Sb between the first pivot 11b and the viscoelastic body Mb1, and the distance Tb between the second pivot 13b and the viscoelastic body Mb2, the amplitude of vibration Vi can be increased or decreased. For the vibration damping mechanism OC, the description is similar, and thus omitted. As stated above, the vibration damping mechanism 10A, 10B, 10C can efficiently decrease the deformation of the structure, whether it is large or small, with a simple configuration obtained by changing the distances La, Sa, Ta, etc.

Between the columns 1, only one vibration damping mechanism 10A (10B, 10C) or a plurality of vibration damping mechanisms obtained by combination of them may be disposed. Further, the vibration damping mechanism can be disposed not only vertically between opposed horizontal members, but also horizontally between vertical members (for example, the columns 1) or between opposed beam members (frame members) disposed in parallel on the supports, depending upon the direction of the vibration applied.

2nd Embodiment

Figure 4:
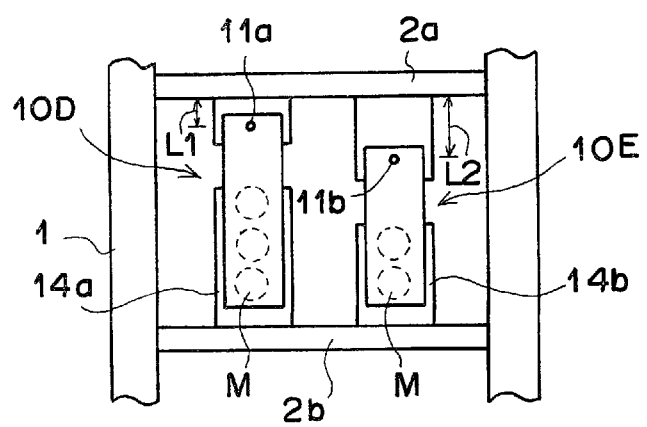
FIG. 4 shows a front view of a vibration damping mechanism of a second embodiment.

Next, FIG. 4 shows a vibration damping mechanism 10D, 10E having another configuration. The vibration damping mechanism 10D has practically the same configuration as that of the vibration damping mechanism 10A, but a second fixed plate 14a is not provided with a second pivot 13a, and a gap 5 between a connecting plate 15a and the second fixed plate 14a is filled with a viscoelastic body M. The distance between a first pivot 11a and an upper frame member 2a is L1. The vibration damping mechanism 10E provides the vibration damping mechanism 10D in which the distance of the first pivot 11a from the upper frame member 2a is changed to L2. Thus, by changing the position of the first pivot 11a, 11b, the amplitude of vibration of the viscoelastic body M can be varied for a given horizontal displacement of the upper frame member 2a. Therefore, by conveniently disposing the vibration damping mechanism 10C, 10D singly or in combination and selecting the viscoelastic body, the horizontal vibration of a structure can be reduced as is the case with the first embodiment.

3rd Embodiment

Figure 5:
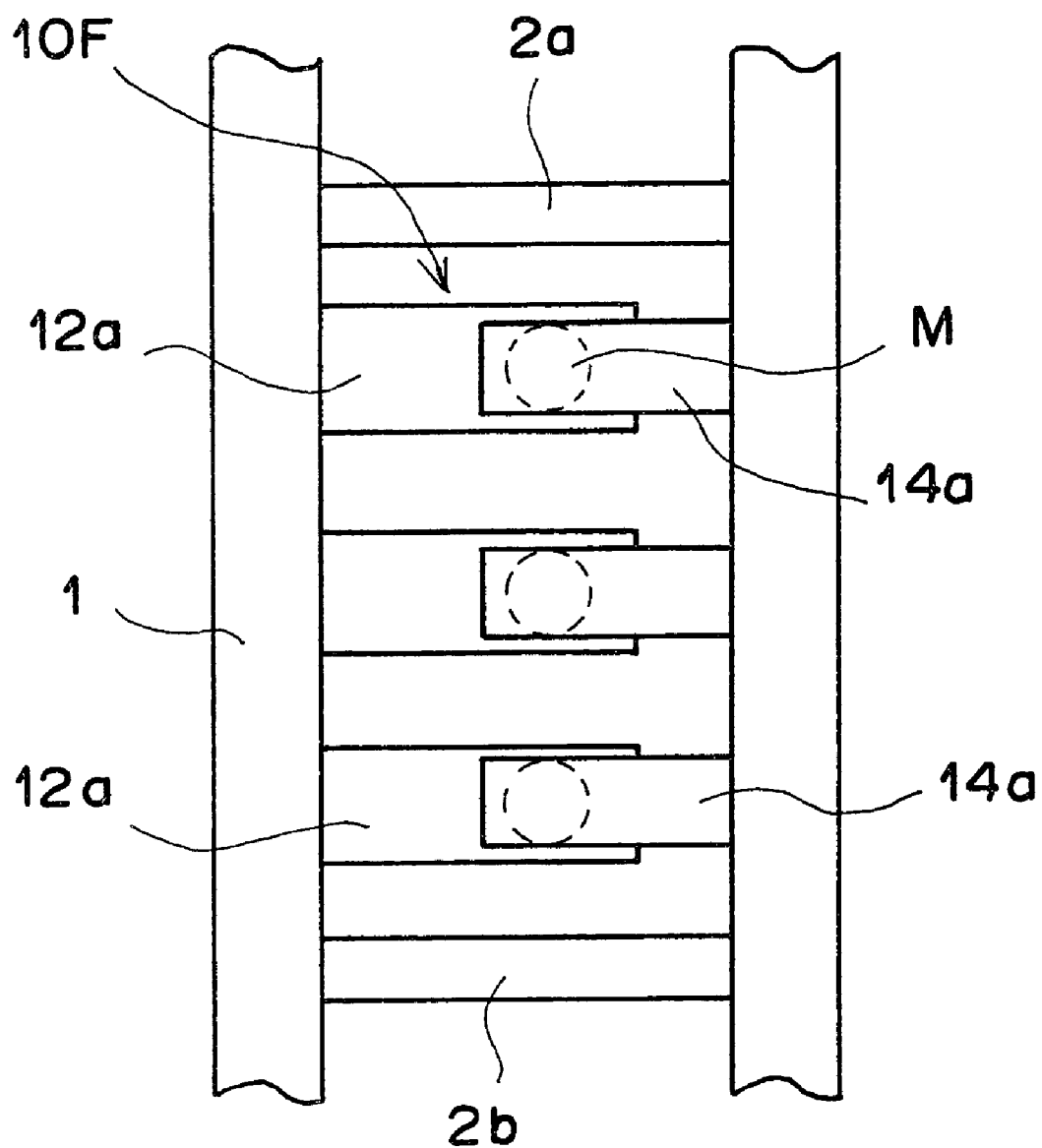
FIG. 5 shows a front view of a vibration damping mechanism of a third embodiment.

FIG. 5 shows a vibration damping mechanism 10F having another configuration. A first fixed plate 12a and a second fixed plate 14a are laid to overlap each other, and the overlapping portion is filled with a viscoelastic body M, the assembly being fixed between columns 1. The amplitude of vibration of the viscoelastic body M is related to the distance between the columns 1, the distance h between an upper frame member 2a and a lower frame member 2b, and the amplitude of vibration (in the vertical direction) between the layers comprising the upper frame member 2a and the lower frame member 2b. Thus, by appropriately selecting the L and the viscoelastic body, the vertical vibration of a structure can be efficiently reduced. Not only a plurality of vibration damping mechanisms 10F but also a single vibration damping mechanism 10F may be disposed, and they (it) may be disposed between the upper frame member 2a and the lower frame member 2b rather than between the columns 1 to provide against horizontal vibrations.

Figure 6A:
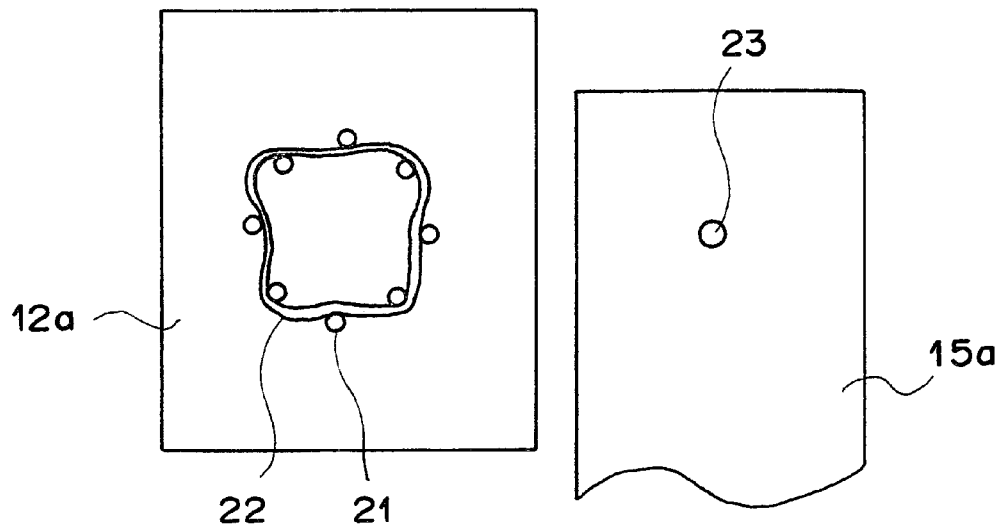
FIG. 6A and FIG. 6B are drawings for explaining a concept of manufacturing a vibration damping mechanism.
Figure 6B:
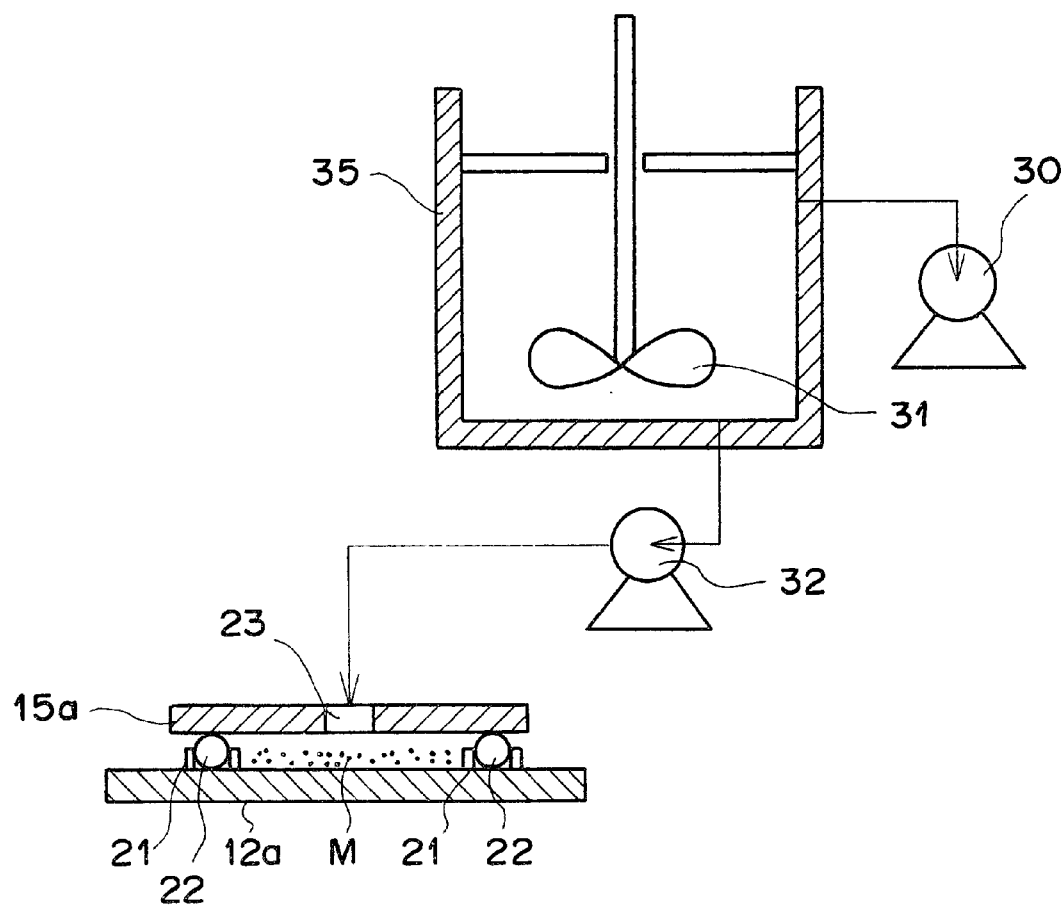

Next, the method for manufacturing a vibration damping mechanism will be explained with reference to FIG. 6A and FIG. 6B by taking the vibration damping mechanism 10A as an example where the viscoelastic body M is filled between the first fixed plate 12a and the connecting plate 15a. FIG. 6A shows a plan view of the first fixed plate 12a and the connecting plate 15a, and FIG. 6B shows a conceptual drawing illustrating how to pour in the viscoelastic body M. The first fixed plate 12a is provided with a plurality of guide rods 21 installed in the positions determining the range (preferably the area of an almost circular shape) to fill the viscoelastic body M with the connecting plate 15a, and an air-permeable rope 22 (made of such a material as hemp) is installed inside (or alternately inside and outside) of the guide rods 21. The diameter of the rope 22 must be selected so that it is equal to the height of the viscoelastic body M. On the other hand, the connecting plate 15a is provided with a filler hole 23 for a viscoelastic body.

Then, by laying the first fixed plate 12a and the connecting plate 15a so as to overlap each other and fixing them to each other, and pouring the viscoelastic body M into the filler opening 23, the internal air is discharged through the air-permeable rope 22, and with the rope 22 being uniformly pressurized, the viscoelastic body M is formed almost cylindrically, being sandwiched between the first fixed plate 12a and the connecting plate 15a. Thus, by using the air-permeable rope 22, the viscoelastic body M can be conveniently poured in while discharging the air for manufacturing a vibration damping mechanism. The guide rods 21 may be provided for the connecting plate 15a, and by appropriately changing the positions of the guide rods 21, the viscoelastic body can be formed in a shape not limited to a circular one, although for uniformly pressurizing the viscoelastic body, it is most convenient to form an almost circular shape.

If the outside of the rope 22 is under negative pressure, the air involved in the viscoelastic body M is discharged, and thus the viscoelastic body M which improves the performance can be provided. As the viscoelastic body M, such a substance as asphalt containing organic polymer is used, but by stirring the viscoelastic body M inside a container 35 with a stirrer 31 while evacuating the container 35 with a vacuum pump 30, the deaerated viscoelastic body M can be obtained. Then, by introducing the viscoelastic body M into the filler opening 23 under pressure through a high-viscosity pump 32, the deaerated viscoelastic body M is filled, thus improving the efficiency of vibration reduction. In other words, the deaerated viscoelastic body can contribute to improvement of the shear resistance force and increase in the limit amplitude of vibration, thus providing a preferable viscoelastic body.

Figure 7:
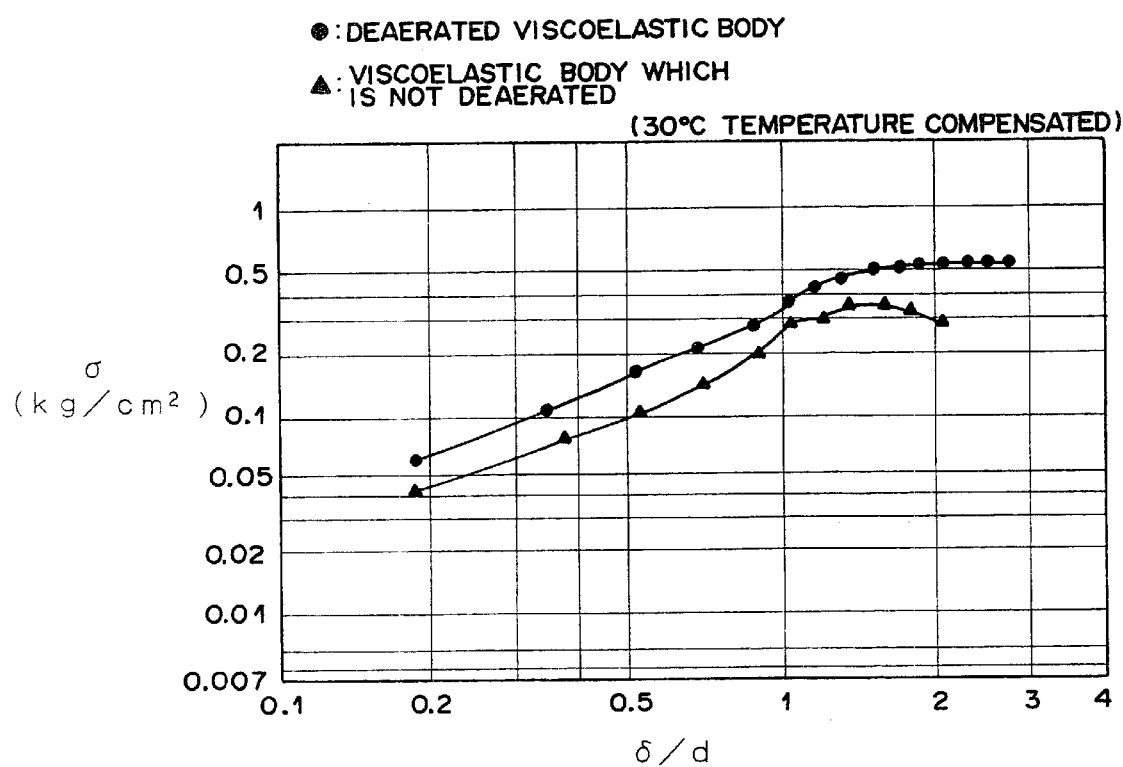
FIG. 7 is a diagram illustrating the results of a tensile test for a viscoelastic body which is deaerated and a viscoelastic body which is not deaerated.

FIG. 7 shows the results of a shear resistance test at a temperature of 30° C. for a deaerated viscoelastic body and a viscoelastic body which is not deaerated, the abscissa representing the amount of shear deformation to the shear thickness ($\delta/d$) of the viscoelastic body and the ordinate representing the resistance force ($\sigma$). From the results of this test, it is obvious that the deaerated viscoelastic body offers a higher resistance force and a larger amount of shear deformation prior to the fracture. This is probably because the area where the viscoelastic body adheres to the fixed plate (the connecting plate) and the shear area are increased, and a stress concentration due to air bubbles is not caused. The above description of the vibration damping mechanisms 10A to 10F has involved an application where they are mounted to members inside of a building. However, they can, of course, be mounted to a member for a building and that for another building to absorb the vibrations of both buildings.

4th Embodiment

Figure 8A:
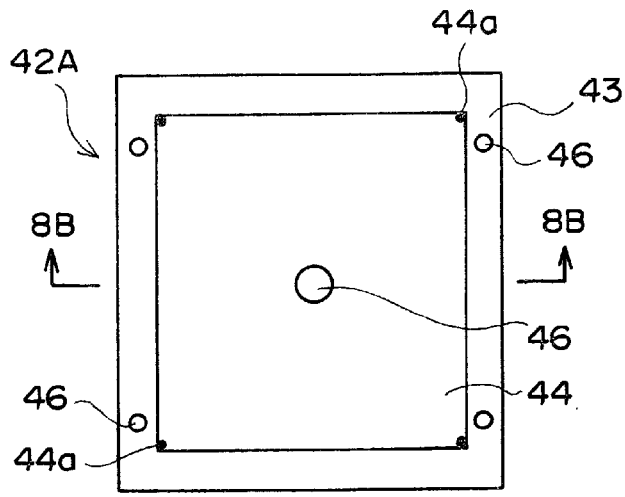
FIG. 8A shows a conceptual plan view of an anti-earthquake wall material of a fourth embodiment.
Figure 8B:
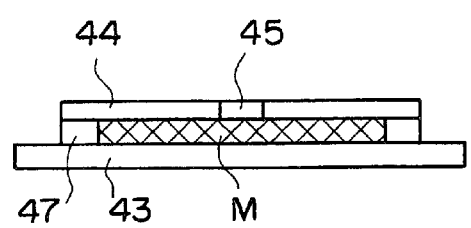
FIG. 8B and FIG. 8C show a sectional view taken along the line 8B—8B in FIG. 8A, respectively.
Figure 8C:
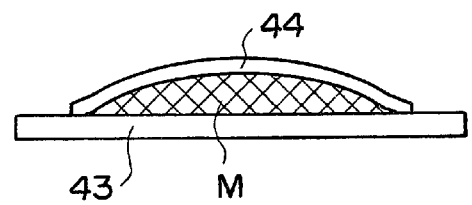

FIG. 8A shows a plan view of an anti-earthquake wall material 42 (42A) to be connected to a construction work (beam, column) for a building or the like, or an auxiliary member of the construction work, and FIG. 8B shows a sectional view taken along the line 8B—8B. The anti-earthquake wall material 42A comprises a base plate material 43 made of a metal, an auxiliary plate material 44 made of a metal, and a viscoelastic body M. The auxiliary plate material 44 has a shorter length and breadth than those of the base plate material 43. Jointing holes 46 for mounting to a beam or the like are formed in the marginal portion of the base plate material 43, and the base plate material 43 and the auxiliary plate material 44 form a space through a spacer 47, being hermetically jointed to each other (FIG. 8B). Alternatively, the marginal portion of the auxiliary plate material 44 is hermetically jointed to the base plate material 43 by welding to form a space (FIG. 8C). At the corners of the auxiliary plate material 44 small air vents 44a are formed to discharge the air in the space when a viscoelastic body M, which is later described, is filled into the space. Then, after filling the space with the viscoelastic body M from an opening 45 provided in the auxiliary plate material 44, the opening 45 and the air vents 44a are closed. As the viscoelastic body M, such a substance as asphalt containing organic polymer is used.

By selecting, for the base plate material 43, a material and plate thickness which cause elastic buckling, and allowing a deformation to be provided for the viscoelastic body M in conjunction with the auxiliary plate material 44, a vibration energy absorption mechanism is configured. Then, because the buckling load for a plate material (having a length of the shorter side of "a" and a thickness of "t") is in proportion to $(t/a)^2$, and thus, if (t/a) is sufficiently large, buckling is not caused within the limit of elastic deformation, an appropriate small value of (t/a) is specified for the base plate material 43 and the auxiliary plate material 44 so that buckling can be caused within the limit of elastic deformation. For the auxiliary plate material 44, it is not always necessary to select the material and the plate thickness with which buckling is caused within the limit of elastic deformation with the shear deformation of the base plate material 43, and the auxiliary plate material 44 may be formed in a corrugated or other shape which allows deformation with no resistance.

Figure 9A:
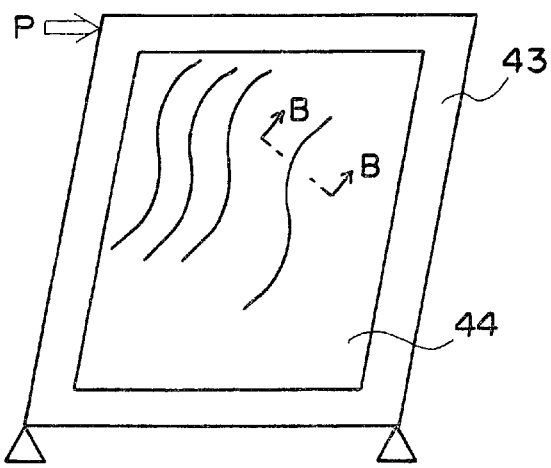
FIG. 9A is a drawing for explaining the function of an anti-earthquake wall material.
Figure 9B:
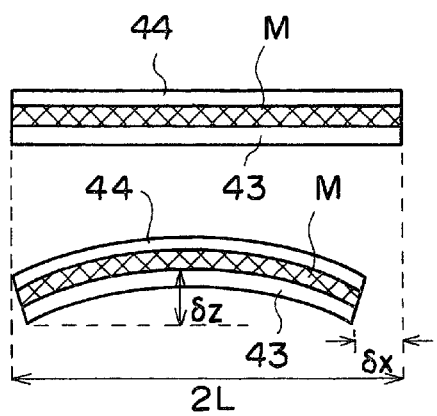
FIG. 9B is a drawing illustrating the dynamics under compression force.

As shown in FIG. 9A, a load P higher than the buckling load is imposed on the base plate material 43 to cause buckling, and a partial section of the buckled area is shown in FIG. 9B. Here, it is assumed that a partial length of the base plate material 43 is 2L, and the amount of displacement along the direction of the X axis (within the plain), the Z axis (outside the plain) is δx, δz. If the deformation curve as shown in the lower figure in FIG. 9B is conveniently linearized, the expression is $δz=(L^2-(L-δx/2)^2)^{1/2}$, which is further expressed by $δz/δx =(L^2-(L-δx /2)^2)^{1/2}/δx$. This amplitude-of-vibration ratio (δz/δx) is the deformation rate ratio, the value of which is large, and with the outside-plane deformation δz of this base plate material 43 which buckles, an amplitude-of-vibration or deformation rate amplifying mechanism can be configured.

Figure 10A:
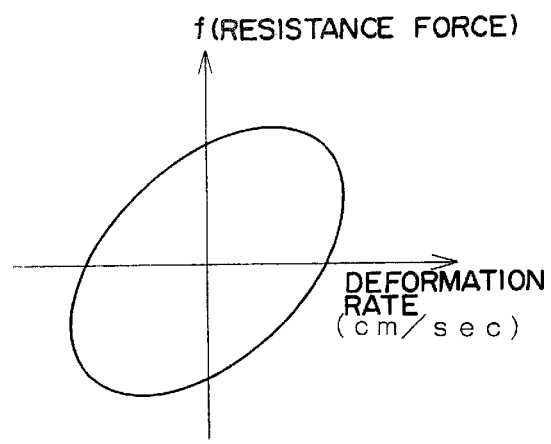
FIG. 10A is a characteristic curve diagram for a viscoelastic body.

In addition, with the viscoelastic body M filled into the space between the base plate material 43 and the auxiliary plate material 44, a shear deformation is caused, and the shear deformation resistance of this viscoelastic body M is roughly proportional to the ratio of the deformation rate V to the thickness t, (V/t). Thus, if the moving rate for the end of the base plate material 43 is low, the amplitude-of-vibration ratio (δz/δx) is high, which results in the shear deformation rate for the viscoelastic body M being high, which means that the shear deformation resistance of the viscoelastic body M, i.e., the amount of vibration energy absorption is large. FIG. 10A shows the characteristic curve for the viscoelstic body M, the area inside of the closed curve expressing the amount of energy absorption. Therefore, when the base plate material 43 is connected to a vibrating framework, the base plate material 43 provides elastic buckling to maintain the rigidity, serving as a vibration energy absorption mechanism (a damper). The buckling wrinkles in the base plate material 43 cause movement of the viscoelstic body M, and the resistance force to the movement also serves to absorb the vibration energy.

5th Embodiment

Figure 11A:
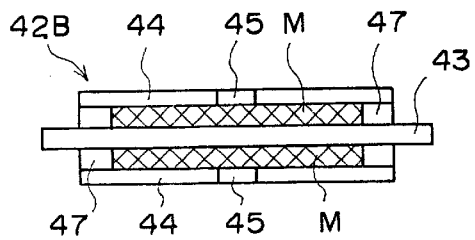
FIG. 11A and FIG. 11B are conceptual sectional views of an anti-earthquake wall material of a fifth embodiment.
Figure 11B:
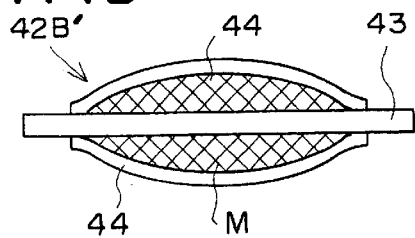

FIG. 11A and FIG. 11B show sectional views (equivalent to FIG. 8B, FIG. 8C) of an anti-earthquake wall material 42B, 42B' having another configuration, a space being formed on both sides (the upper and lower sides) of a base plate material 43 through a spacer 47 for hermetic welding (FIG. 11A). Alternatively, the marginal portion of an auxiliary plate material 44 is hermetically jointed to both sides (the upper and lower sides) of the base plate material 43 by welding to form a space, and the space is filled with a viscoelastic body M (FIG. 11B). At the corners of the auxiliary plate material 44 small air vents 44a (not shown) are formed which are closed after the space has been filled with the viscoelastic body M. The same parts as those in FIG. 8A, FIG. 8B are each provided with the same reference numeral, and description is omitted. Thus, by filling the viscoelastic body M into the space on both sides of the base plate material 43, the amount of energy absorption by the anti-earthquake wall material 42B, 42B' is increased.

6th Embodiment

FIG. 12A shows an anti-earthquake wall material 42C having another configuration, FIG. 12A showing a plan view and FIG. 12B showing a sectional view taken along the line 12B—12B. The same parts as those in FIG. 8A, FIG. 8B are each provided with the same reference numeral, and description will be omitted. The anti-earthquake wall material 42C comprises a base plate material 43 made of a metal, an auxiliary plate material 44 made of a metal, and a lead plate material 48. The auxiliary plate material 44 has a shorter length and breadth than those of the base plate material 43, and jointing holes 46 for mounting to a beam or the like are formed in the marginal portion of the base plate material 43. A lead plate 48 having roughly the same size as that of the auxiliary plate material 44 is fixed inside of a spacer 47, and a space is formed through the spacer 47 for hermetic jointing (FIG. 12B). When a viscoelastic body M is not to be filled into this space, there is no need to form an opening 45, while when it is to be filled, an opening 45 is formed (FIG. 12C).

Figure 10B:
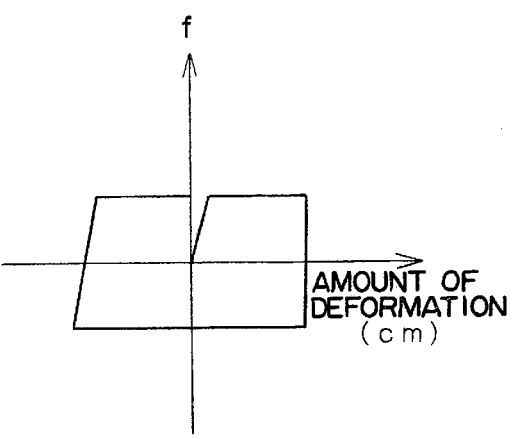
FIG. 10B is a characteristic curve diagram for a lead plate material.

The lead plate material 48 may be mounted so that it can buckle when the base plate material 43 is buckled, and it may be mounted in contact with the base plate material 43 as shown in FIG. 12B, or between the base plate material 43 and the auxiliary plate material 44 as shown in FIG. 12H. With this anti-earthquake wall material 42C, when the base plate material 43 is deformed, providing elastic buckling, the lead plate material 48 is also buckling-deformed, and on the basis of the characteristic curve for this lead plate material 48 (see FIG. 10 B), it absorbs the energy, functioning in basically the same way as a viscoelastic body.

FIG. 12D to FIG. 12I show conceptual plan and sectional views illustrating the configurations of various anti-earthquake wall materials using a lead plate material 48, and with an anti-earthquake wall material 42D as shown in FIG. 12D, an auxiliary plate material 44 and a lead plate material 48 are fixed to a base plate material 43 without a spacer 47 being interposed between them. An anti-earthquake wall material as shown in FIG. 12E, a plan sectional view, comprises a plurality of lead plate materials 48, which are fixed to a spacer 47. Thus, the anti-earthquake wall material 42E is configured with a plurality of lead plate materials 48 rather than a single lead plate material 48, and a gap is formed between lead plate materials 48. With an anti-earthquake wall material as shown in FIG. 12F, an auxiliary plate material 44 and a lead plate material 48 are provided on both sides of a base plate material 43 with a spacer 47 being interposed between them, and with an anti-earthquake wall material as shown in FIG. 12G, a viscoelastic body M is filled into the space. With an anti-earthquake wall material as shown in FIG. 12H, an auxiliary plate material 44 and a lead plate material 48, 48' are directly fixed to a base plate material 43 by welding, and with an anti-earthquake wall material as shown in FIG. 12I, a viscoelastic body M is filled into the space. When a lead plate material 48' is mounted as shown in FIG. 12H, a hole is provided for the lead plate material 48' to fill the viscoelastic body M into the entire space, or as shown in FIG. 12E, by providing a plurality of lead plate materials 48' to form a gap between lead plate materials 48', the viscoelastic body M can be filled into the entire space as shown in FIG. 12I. With regard to this lead plate material 48, 48', it is not always necessary to provide the same configuration on both sides. The configuration may be selected in consideration of the application, etc.

As stated above, a variety of anti-earthquake wall materials as shown in FIG. 8A to FIG. 12I can absorb the energy, and which configuration is to be adopted must be determined in consideration of the geometry, etc. of the application structure. The above-stated anti-earthquake wall materials have a configuration in which an auxiliary plate material is used on one side or both sides of the base plate material, but may be provided with a configuration in which more auxiliary plate materials are used.

Figure 13A:
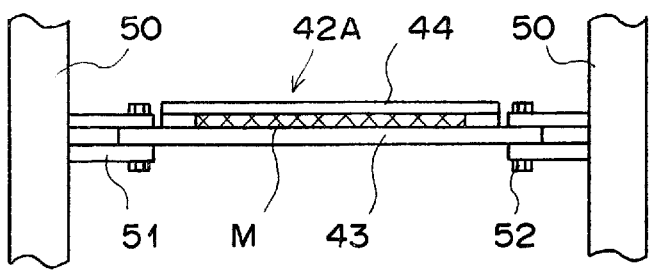
FIG. 13A, FIG. 13B, and FIG. 13C are drawings for explaining concepts of mounting an anti-earthquake wall material to beams.
Figure 13B:
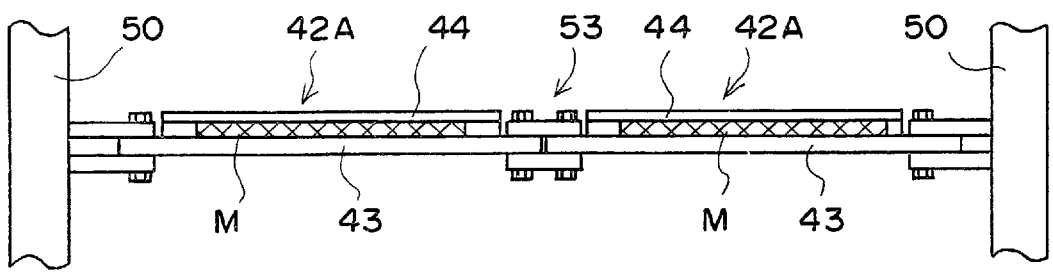
Figure 13C:
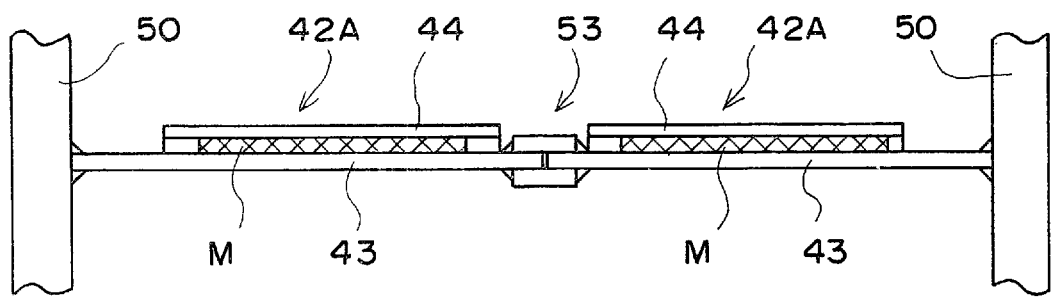

FIG. 13A is a drawing for explaining a concept of mounting the anti-earthquake wall material 42A to a beam 50. The anti-earthquake wall material 42A is fixed to a beam 50 by means of bolts and nuts 52 for the jointing holes 46 formed in the base plate material 43 through a mounting plate 51 fixed to the beam 50. FIG. 13B is a drawing illustrating the anti-earthquake wall material 42A, 42A fixed between a beam 50 and a beam 50, being connected to each other in the middle with a connector 53. Thus, the jointing holes 46 provided in the base plate material 43 for the anti-earthquake wall material 42A can be used to conveniently fix and joint the anti-earthquake wall material 42A, 42A between the beam 50 and the beam 50. The above description has involved an application where the base plate material 43 in the anti-earthquake wall material 42A is connected to the beam 50 through the mounting plate 51 or the like, but as shown in FIG. 13C, the base plate material 43 may be directly welded and fixed to a framework (a beam or column) 50 or a connector 53, or the adjacent base plate material 43.

7th Embodiment

Figure 14A:
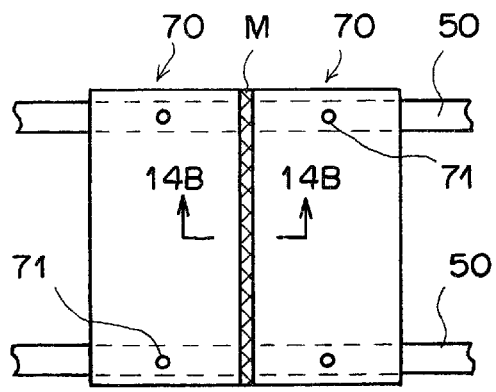
FIG. 14A shows a front view of an anti-earthquake wall material of a seventh embodiment which is mounted to beams.
Figure 14B:
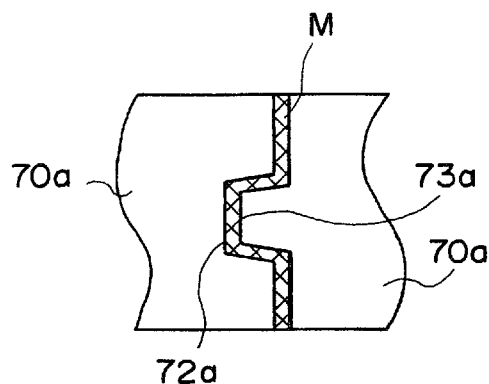
FIG. 14B shows a sectional view taken along the line 14B-14B in FIG. 14A.
Figure 14C:
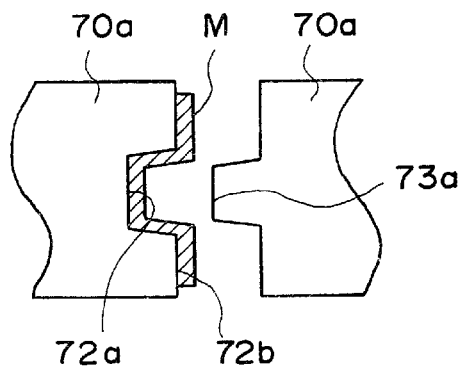
FIG. 14C and FIG. 14D are drawings illustrating the way of sandwiching a viscoelastic body between the members of an anti-earthquake wall material for anchoring it.
Figure 14D:
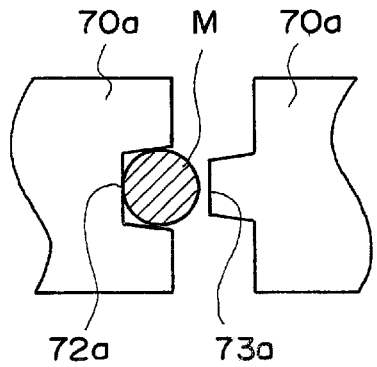
Figure 14E:
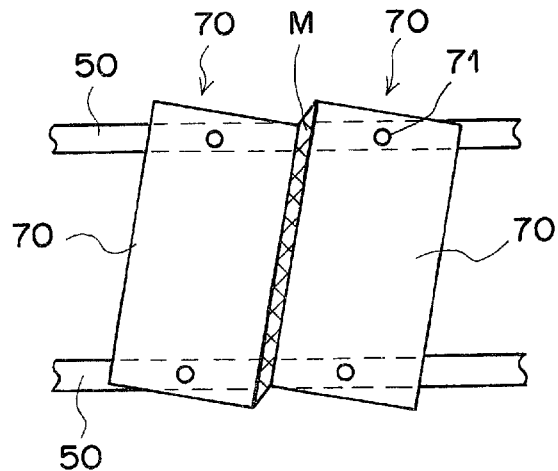
FIG. 14E is a conceptual drawing illustrating an anti-earthquake wall material being deformed when the beams are moved.

The present embodiment, which is different to the above-described embodiments, relates to the joint of an anti-earthquake wall material to another anti-earthquake wall material, and will be explained with reference to FIG. 14A to FIG. 14E. FIG. 14A shows a front view of an anti-earthquake wall material 70 which is rotatably mounted to a framework (beams 50 or columns), and FIG. 14B shows a sectional view taken along the line 14B—14B. The anti-earthquake wall material 70 comprises a base plate material 70a made of a metal or the like, and is rotatably mounted by inserting a pivot 71 fixed to the beam 50 into a hole (not shown) provided for the base plate material 70a. On the sides of the adjacent base plate material 70a, 70a there are formed a fitting groove 72a and a projection 73a which can be fitted and jointed to each other. The base plate materials 70a, 70a are jointed to each other with an viscoelastic body M, such as asphalt containing organic polymer, being sandwiched between the fitting groove 72a and the projection 73a. Methods for sandwiching a viscoelastic body M include the method in which, as shown in FIG. 14C, the viscoelastic body M is applied to the fitting groove 72a and the flat portion 72b in one base plate material 70a, and the adjacent base plate material 70a is pressed against the viscoelastic body M for fitting and jointing. Also included are the method in which, as shown in FIG. 14D, a bar-like viscoelastic body M is applied to the fitting groove 72a, and the adjacent base plate material 70a is pressed against the viscoelastic body M for fitting and jointing the projection 73a to the fitting groove 72a.

Figure 15A:
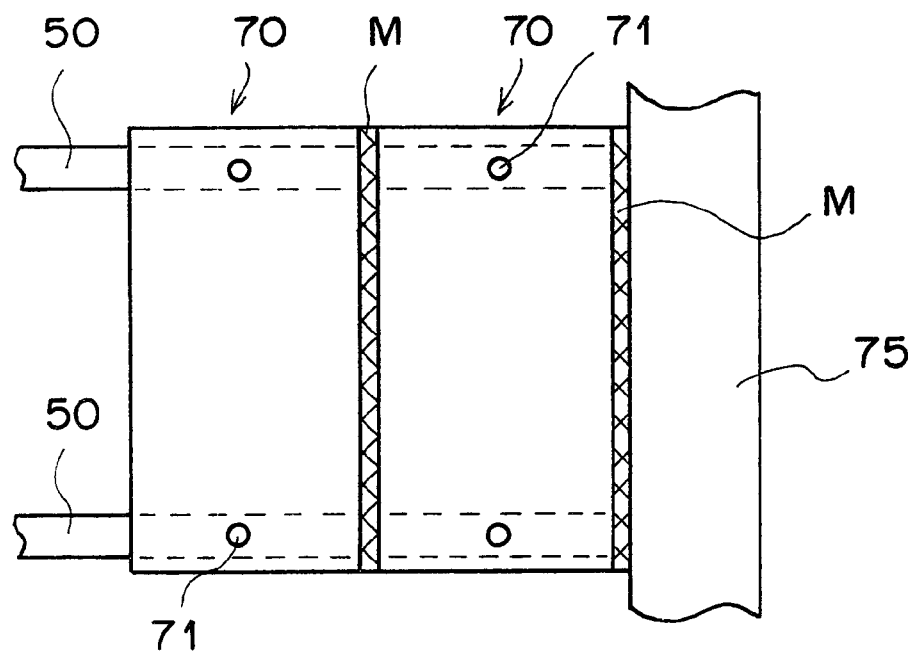
FIG. 15A is a front view illustrating the joint of an anti-earthquake wall material to a column.
Figure 15B:
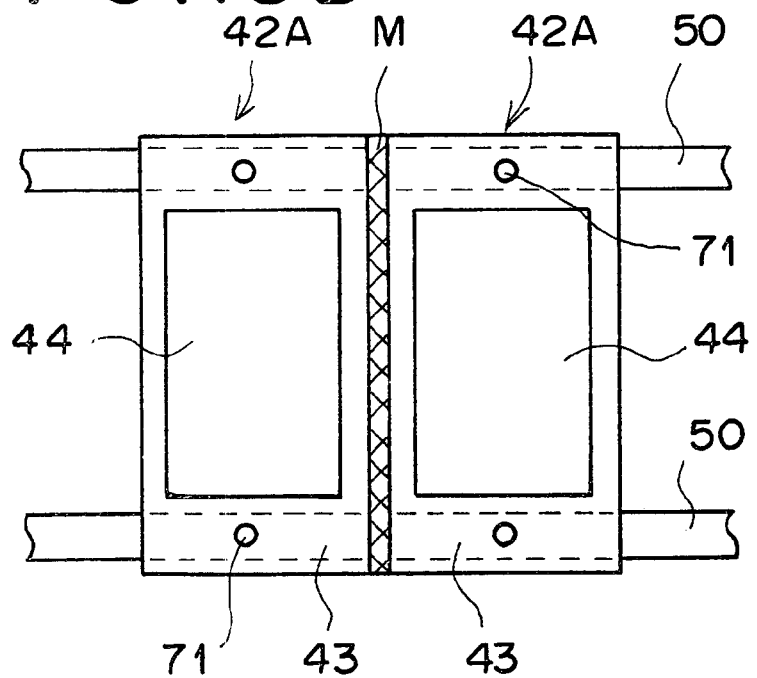
FIG. 15B is a front view of the same when an anti-earthquake wall material of another configuration is used.

As stated above, the adjacent anti-earthquake wall materials 70, 70 are jointed to each other through the viscoelastic body M, which serves as a joint, providing a waterproof effect, and thus require no treatment for waterproofing. When a load P is imposed on the beam 50, resulting in the beam 50 being moved, the anti-earthquake wall material 70 is turned about the pivot 71, which causes the joint to be displaced, and the deformation of the viscoelastic body M due to this displacement absorbs the vibration energy, reducing the degree of rocking of the beam (framework) 50. The fitting groove 72a and the projection 73a formed on the sides of the base plate materials 70a are provided to assure thorough jointing of the base plate materials 70a to each other, and thus the geometries are not limited to the examples as given in the figures. Instead of forming the fitting groove 72a and the projection 73a, plain surfaces may be provided to sandwich a viscoelastic material between them for jointing. Besides jointing an anti-earthquake wall material 70 to another anti-earthquake wall material 70 as stated above, an anti-earthquake wall material 70 may be jointed to a column 75 though the viscoelastic material M as shown in FIG. 15A. The above-stated anti-earthquake wall material 70 comprises a single part, namely the base plate material 70a, but an anti-earthquake wall material 42A, for example, which comprises a base plate material 43 and an auxiliary plate material 44 into which a viscoelastic body is filled as stated in the 4th to 7th embodiments may, of course, be used (see FIG. 15B).

The above description of the anti-earthquake wall materials 42 with various configurations has involved an application where they are mounted to members inside of a building. However, they can, of course, be mounted to a member for a building and a member for another building to absorb the vibration of both buildings. This application will be described with reference to FIG. 16A to FIG. 16F showing front views when anti-earthquake wall materials are used with a building, and FIG. 16G to FIG. 16L showing a sectional view corresponding to FIG. 16A.

Figure 16B:
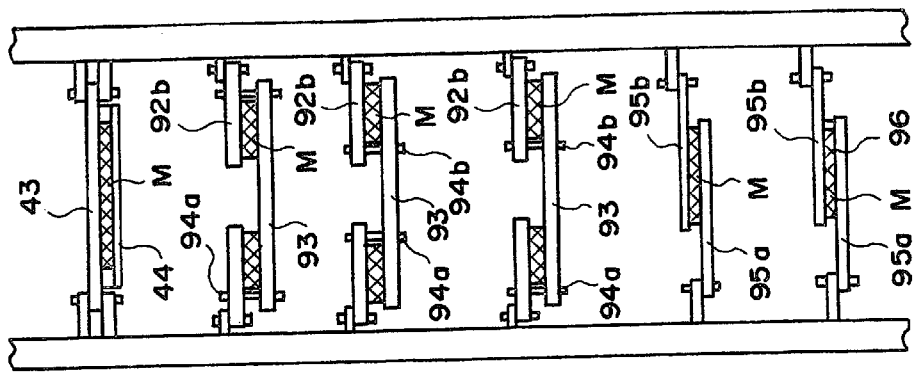
FIG. 16B is a sectional view corresponding to FIG. 16A.
Figure 16A:
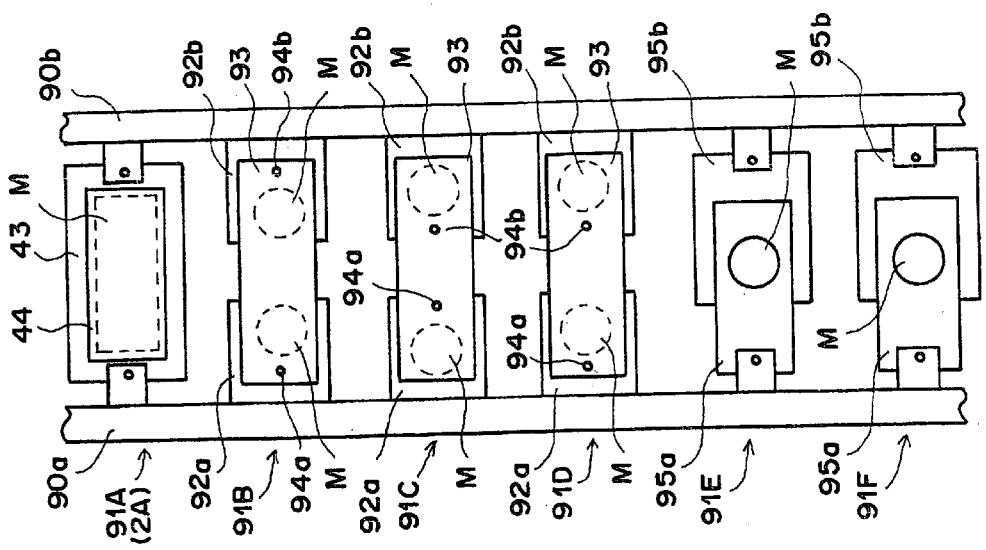
FIG. 16A is a front view illustrating a concept when anti-earthquake wall materials of various configurations are used with a building.

An anti-earthquake wall material 91A as shown in FIG. 16A, FIG. 16B is an anti-earthquake wall material 42A as shown in FIG. 13A which is used with a column 90a for a building and a column 90b for another building. A viscoelastic body M is filled between a base plate material 43 and an auxiliary plate material 44, and when the building deforms, elastic buckling is caused in the anti-earthquake wall material 91A to hold the rigidity and absorb the vibration energy. Thus, the vibrations caused in both buildings can be absorbed. With an anti-earthquake wall material 91B, 91C, 91D as shown in FIG. 16B, which has a configuration different from that of the anti-earthquake wall material 91A, base plate materials 92a, 92b are fixed to a column 90a for a building, and a column 90b for another building. A connecting plate material 93 forming an overlapping portion with the base plate material 92a, 92b is made rotatable, and into this overlapping portion, a viscoelastic body M is filled. However, the pivoting position 94a, 94b of the connecting plate material 93 varies with respect to the viscoelastic body M. Thus, by varying the pivoting position 94a, 94b of the connecting plate material 93, an appropriate one of the various types of viscoelastic body M can be selected, which allows the anti-earthquake wall material to be conveniently configured. An anti-earthquake wall material 91E as shown in FIG. 16B is an anti-earthquake wall material in which a base plate material 95a and a base plate material 95b form an overlapping portion, and in the overlapping portion, a viscoelastic body M is sandwiched (filled), and thus can be conveniently configured to provide a vibration absorption effect. An anti-earthquake wall material 91F as shown in FIG. 16A is the anti-earthquake wall material 91E in which the viscoelastic body M is loaded with rolling members (such as spherical or cylindrical bodies) 96, and thus allows a hard material with high viscosity to be used as a viscoelastic body M, which can improve the vibration reduction performance.

What is claimed is:

1. A vibration damping mechanism comprising:

a first plate fixed to an upper frame member of a structure and provided with a first pivot selectively positioned on an outer surface of said first plate;

a second plate coplanar with said first plate and fixed to a lower frame member of said structure opposed in a substantially parallel direction to said upper frame member a certain distance and provided with a second pivot selectively positioned on an outer surface of said second plate lying in a same plane as said first pivot;

a connecting plate opposed to said first plate and said second plate with a gap being provided between said connecting plate and said first plate and said connecting plate and said second plate and is rotatably mounted on said first pivot and said second pivot;

a first viscoelastic body disposed in a position such that it lies within the gap between the connecting plate and said first plate so as to absorb energy during vibration of said framework; and a second viscoelastic body disposed in a position such that it lies within the gap between the connecting plate and said second plate so as to absorb energy during vibration of said framework;

wherein said first viscoelsatic body and said second viscoelsatic body are selectively positioned into their respective gaps based upon the positions of said first pivot and said second pivot so as to enhance the vibrational damping effect of said mechanism.

* * * * *